(12) United States Patent
Kobayashi

(10) Patent No.: US 7,149,394 B2
(45) Date of Patent: Dec. 12, 2006

(54) THREE-DIMENSIONAL OPTICAL WAVEGUIDE AND OPTICAL COMMUNICATION SYSTEM

(75) Inventor: Masaki Kobayashi, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 11/215,018

(22) Filed: Aug. 31, 2005

(65) Prior Publication Data

US 2006/0204176 A1   Sep. 14, 2006

(30) Foreign Application Priority Data

Mar. 9, 2005  (JP) ............................... 2005-065618

(51) Int. Cl.
*G02B 6/02* (2006.01)
*G02B 6/036* (2006.01)
*G02B 6/10* (2006.01)

(52) U.S. Cl. ...................... 385/126; 385/129; 385/131
(58) Field of Classification Search ................ 385/126, 385/131, 129
See application file for complete search history.

(56) References Cited

U.S. PATENT DOCUMENTS

2003/0198439 A1* 10/2003 Hiramatsu .................... 385/39

FOREIGN PATENT DOCUMENTS

JP   11-183747   7/1999
JP   2004-177730   6/2004

* cited by examiner

*Primary Examiner*—Brian Healy
*Assistant Examiner*—Jerry Martin Blevins
(74) *Attorney, Agent, or Firm*—Morgan, Lewis & Bockius, LLP

(57) ABSTRACT

A three-dimensional optical waveguide includes plural cores, a cladding, and an optical path converting device disposed at least at a part of the cores. The cores are provided in a specified direction at least in two rows and in two layers. The cores are buried in the cladding and the cladding has a refractive index different from that of the cores. The optical path converting device converts the direction of the optical path formed by the cores to a direction different from the specified direction.

16 Claims, 17 Drawing Sheets

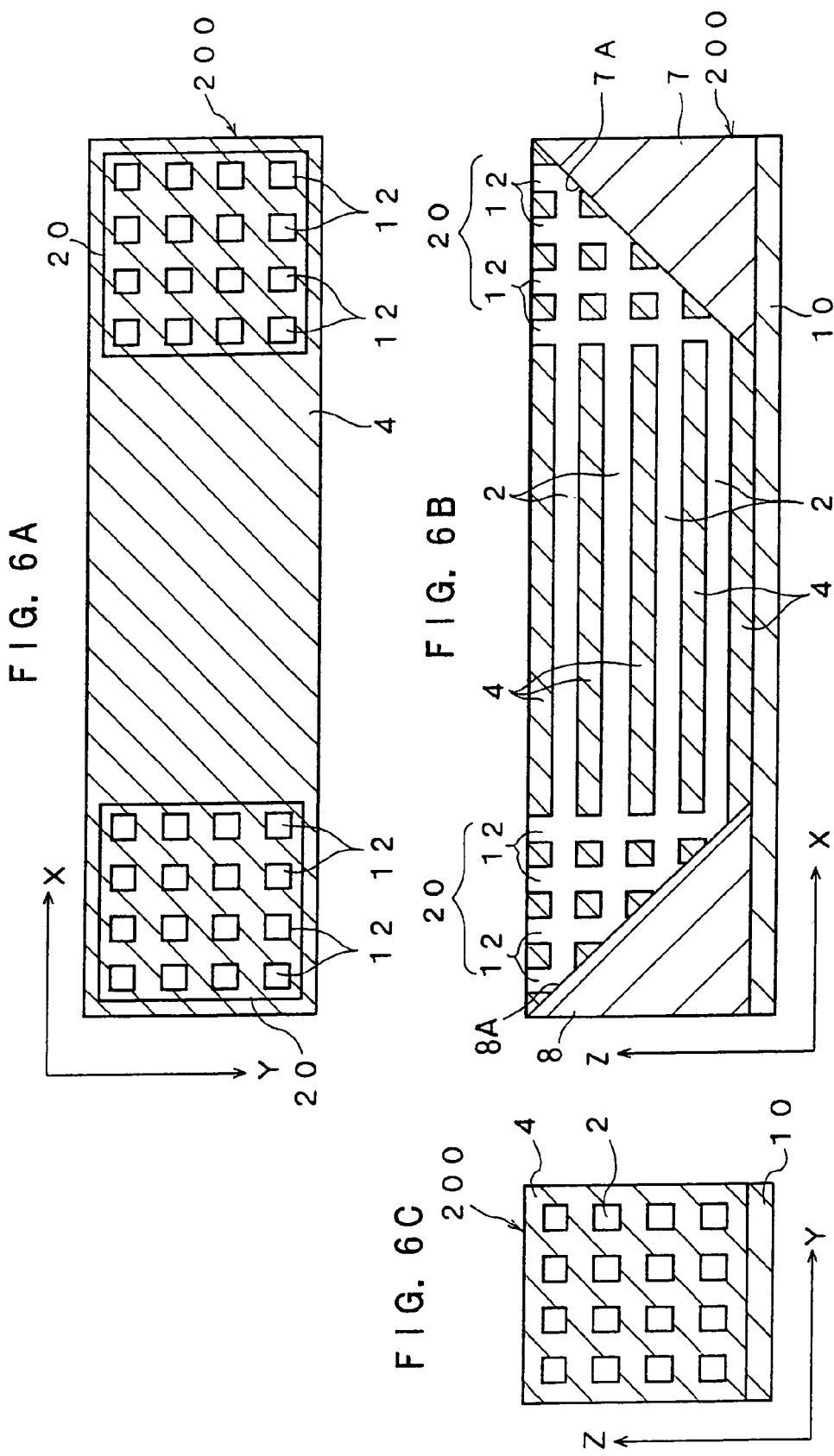

F I G. 20A
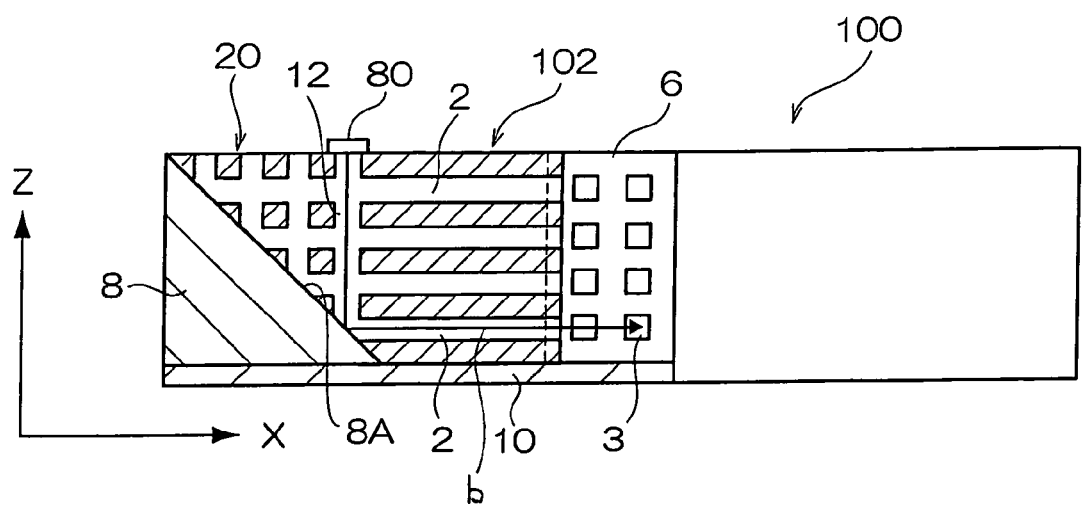
F I G. 20B
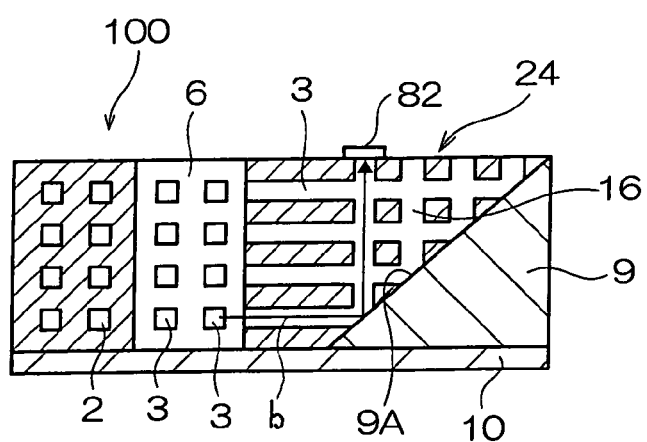

THREE-DIMENSIONAL OPTICAL WAVEGUIDE AND OPTICAL COMMUNICATION SYSTEM

CROSS-REFERENCE TO RELATED APPLICATION

This application claims priority under USC 119 from Japanese Patent Application No. 2005-065618, the disclosure of which is incorporated by reference herein.

BACKGROUND OF THE INVENTION

1. Field of the Invention

The present invention relates to a three-dimensional optical waveguide and an optical communication system and particularly, relates to a three-dimensional optical waveguide wherein optical paths can be laid out in two or three dimensions, and to an optical communication system wherein the three-dimensional optical waveguide is employed.

2. Description of the Related Art

Recently layering two-dimensional optical waveguides to dispose the cores thereof in a three-dimensional lattice to form a plurality of optical buses to increase a communication capacity of an optical waveguide has been investigated (Publication of unexamined patent application Nos. JP1999-183747 and JP2004-177730). Further, an optical waveguide for connecting an optical device to an optical fiber, wherein a direction of an optical path is converted to a perpendicular direction, is proposed (JPCA Symposium 'Advanced Packaging Technology for Optoelectronic Modules'). A mirror converting the direction of the optical path in a right angle is provided at one end of the optical waveguide.

The optical waveguides described in Publication of unexamined patent application Nos. 1999-183747 and 2004-177730 has cores extending in a straight line and thus, light can be introduced to one end and received at the other end. However, the optical path in the optical waveguide cannot be diverted to any desired directions.

Though in the optical waveguide shown in 'Advanced Packaging Technology for Optoelectronic Modules', an optical path can be diverted perpendicularly, for converting the optical path thereof to a further different direction, the optical waveguide needs to be connected to another optical path converting guide by an optical fiber or the like.

SUMMARY OF THE INVENTION

The present invention has been made in view of the above circumstance and provides a three-dimensional optical waveguide and an optical communication system.

According to an aspect of the present invention, a three-dimensional optical waveguide includes plural cores that are disposed in a specified direction at least in two rows and in two layers, a cladding in which the cores are buried and having a refractive index different from that of the cores, and an optical path converting device disposed at least at a part of the cores and converting a direction of an optical path formed by the cores to a direction different from the specified direction.

BRIEF DESCRIPTION OF THE DRAWINGS

Embodiments of the present invention will be described in detail based on the following figures, wherein:

FIG. 6A is a plan view of a three-dimensional optical waveguide of a second embodiment, FIG. 6B and FIG. 6C are sectional views of the three-dimensional optical waveguide sectioned along the X-Z plane and the Y-Z plane, respectively;

FIGS. 20A and 20B are schematic views showing the constitution and the function of an optical communicating system comprising the optical wave guide shown in FIGS. 1A, 1B, and 2, a light-emitting device that is attached on an inlet-outlet portion provided at one end of a main optical wave guide thereof, and a light-receiving device that is attached on an inlet-outlet portion provided at the end of a branch optical wave guide branching from the main optical wave guide.

DETAILED DESCRIPTION OF THE INVENTION

1. A First Embodiment

An example of the three-dimensional optical waveguide of the present invention is described in the following.

Figure 1A:
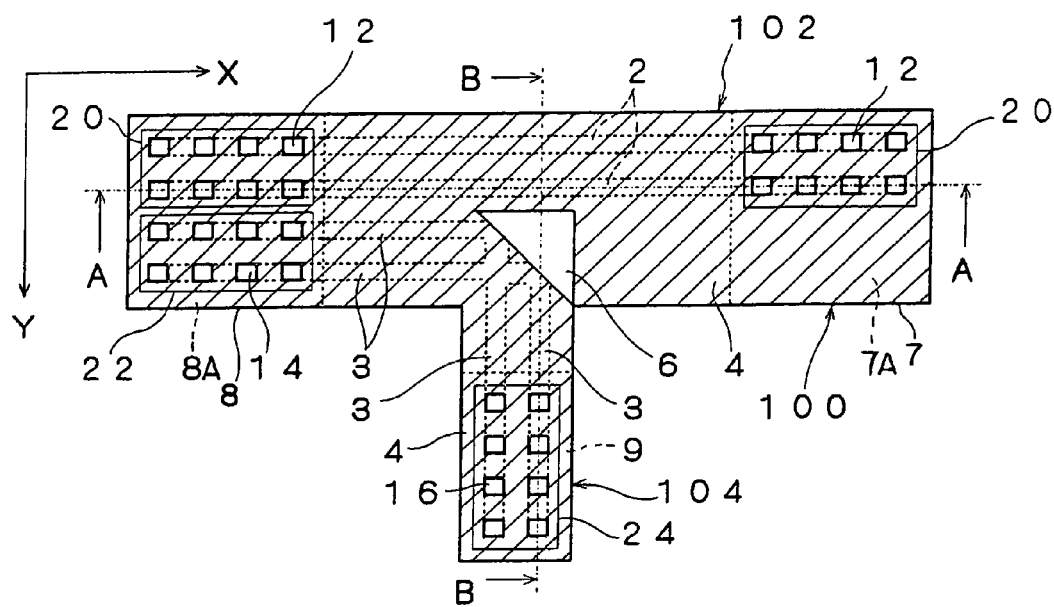
FIG. 1A is a plan view of a three-dimensional optical waveguide of a first embodiment.
Figure 1B:
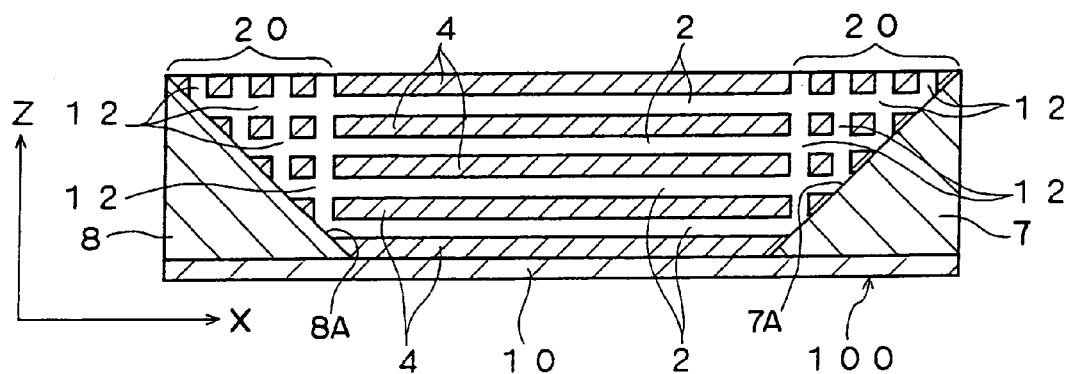
FIG. 1B is a sectional view of the three-dimensional optical waveguide sectioned along an X-Z plane.
Figure 2:
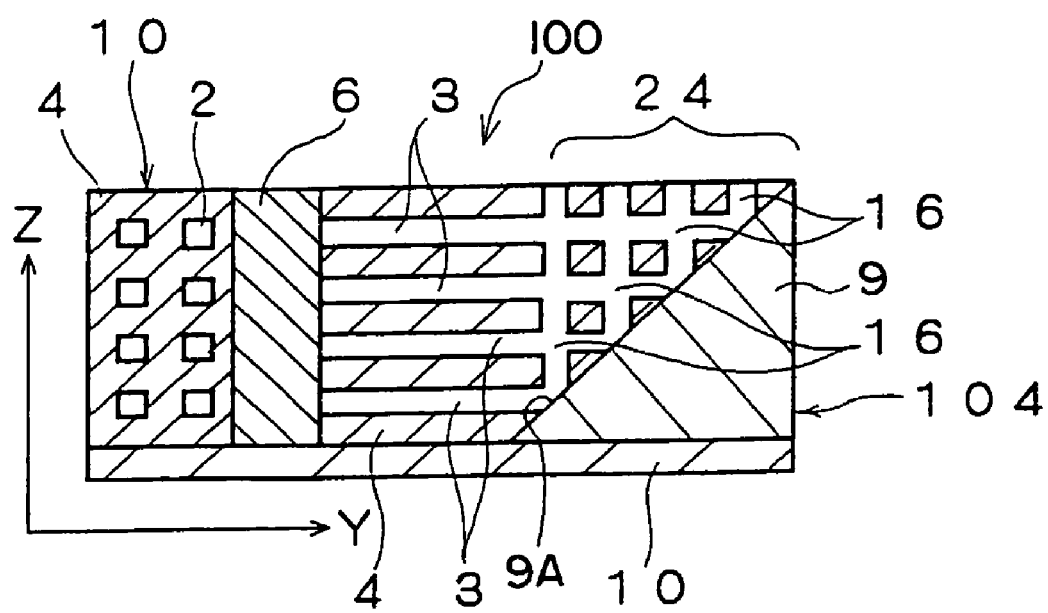
FIG. 2 is a sectional view of the three-dimensional optical waveguide sectioned along a Y-Z plane and showing a construction of main optical waveguide.

FIG. 1A shows a plan view of a three-dimensional optical waveguide 100 of a first embodiment, FIGS. 1B and 2 show sectional views thereof sectioned along a plane A—A and along a plane B—B in FIG. 1A, respectively.

As shown in FIGS. 1A, 1B, and 2, the three-dimensional optical waveguide 100 comprises a main optical waveguide 102 and a branch optical waveguide 104 branching from a central part of the main optical waveguide 102 in the Y-direction.

Both the main optical waveguide 102 and the branch optical waveguide 104 are formed on a base 10.

A mirror 6, which is an optical path converting device converting an optical path in the X-direction to the Y-direction, is buried inside of the main optical waveguide 102 at a point where the branch optical waveguide 104 branches. The mirror 6 has a plan shape of right-angled isosceles.

Cores 2 and 3 are formed inside of the main optical waveguide 102 and the branch optical waveguide 104. The cores 2 are the cores penetrating through the main optical waveguide 102 in the X-direction to form optical paths along the X-direction. The cores 3 are the cores extending in the X-direction from one end of the core 102 to the mirror 6 and changing the direction thereof to the Y-direction at the mirror 6 so as to penetrate through the branch optical waveguide 104 to form optical paths bending in the right angle. Both the cores 2 and 3 are disposed in two rows in the X-Y plane and in four layers along the Z-direction.

The cores 2 and 3 have the same refractive index and are buried in a cladding 4 having a smaller refractive index than the cores 2 and 3. In FIG. 1 and the followings, the cores 2 and 3 are shown as open areas and the cladding 4 is shown as oblique lined areas.

At both ends thereof, the cores 2 lead to inlet-outlet optical paths 12 extending in the Z-direction. The cores 3 lead to inlet-outlet optical paths 14 extending in the Z-direction at the end of the portion thereof extending in the main optical waveguide 102. The cores 3 are also connected to inlet-outlet optical paths 16 extending in the Z-direction at the end of the portion thereof extending in the branch optical waveguide 104. Sixteen of the inlet-outlet optical paths 12 are provided at each end of the cores 2, which are provided in two rows and four layers. Eight of the inlet-outlet optical paths 14 are provided since each of the cores 3, which are disposed in two rows and four layers, have one inlet-outlet optical paths 14 at one end. Eight of the inlet-outlet optical paths 16 are provided since each of the cores 3 has one of the inlet-outlet optical paths 16 at the other end.

As shown in FIGS. 1A, 1B, and 2, top ends of the inlet-outlet optical paths 12, 14, and 16 are exposed at the top faces of the main optical waveguide 102 or the branch optical waveguide 104 to form inlet-outlet portions 20, 22, and 24, respectively.

At both ends of the main optical waveguide 102, where the cores 2 lead to the inlet-outlet optical paths 12, mirrors 7 and 8 are disposed, respectively. Additionally, at the tip of the branch optical waveguide 104, where the cores 3 are connected to the inlet-outlet optical paths 16, a mirror 9 is provided.

Each of mirrors 7, 8, and 9 is a mirror having a sectional shape of right-angled isosceles and reflecting faces 7A, 8A, and 9A are formed on the inclined faces of the mirrors 7, 8, and 9, respectively. The reflecting faces 7A, 8A, and 9A can be a metallic face or a light-reflecting face making use of a light-reflecting property of a dielectric multilayer film. The metallic face can be a surface of a metal itself or a light-reflective face formed by coating a block of a resin or silicon with a metal such as Ag, Al, Au, or other so as to provide a surface having a metallic gloss.

A procedure for producing the three-dimensional optical waveguide 100 is described in the following.

Figure 3A:
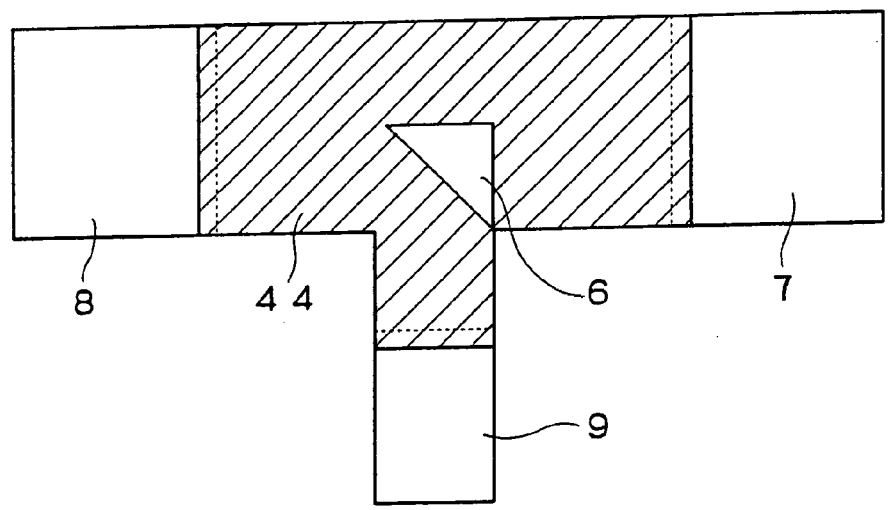
FIGS. 3A and 3B are explanatory diagrams showing a first step of a process for producing the three-dimensional optical waveguide of the first embodiment.
Figure 3B:
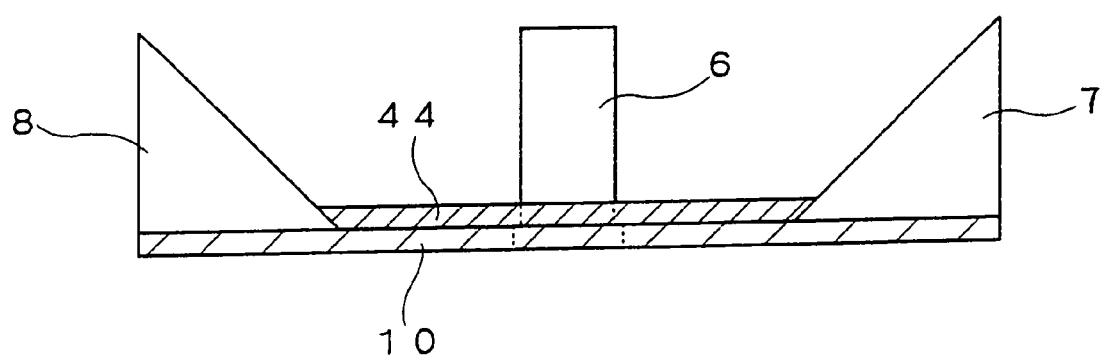

Firstly, as shown in FIGS. 3A and 3B, in a step 1, the mirrors 6, 7, 8, and 9 are placed and fixed on the base 10. Then, the base 10 is spin-coated, for example but not limited to, with a polysilane (registered trade mark: Gracia, a product of Nippon paint Co. Ltd.) and baked at a temperature of about 250° C. to form a cladding layer 44. The cladding layer 44 forms a part of the cladding 4 of the three-dimensional optical waveguide 100.

Figure 4A:
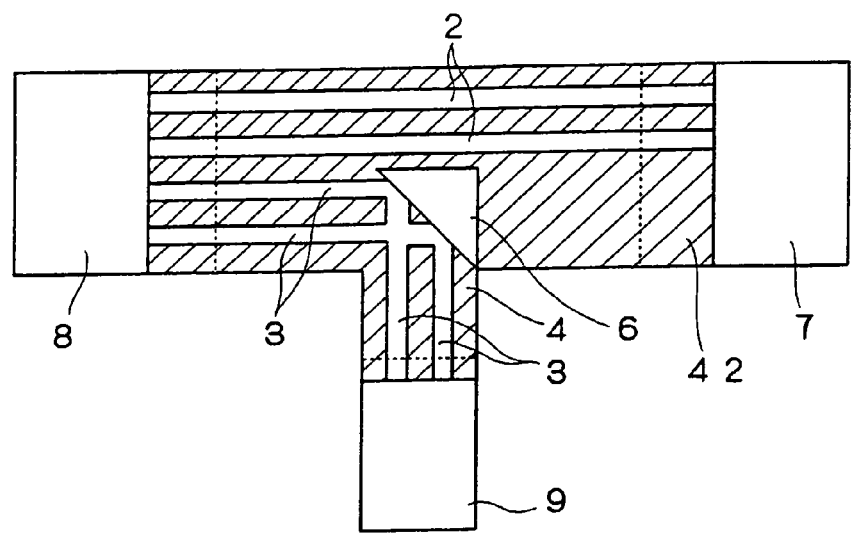
FIGS. 4A and 4B are explanatory diagrams showing a second step of the process for producing the three-dimensional optical waveguide of the first embodiment.
Figure 4B:
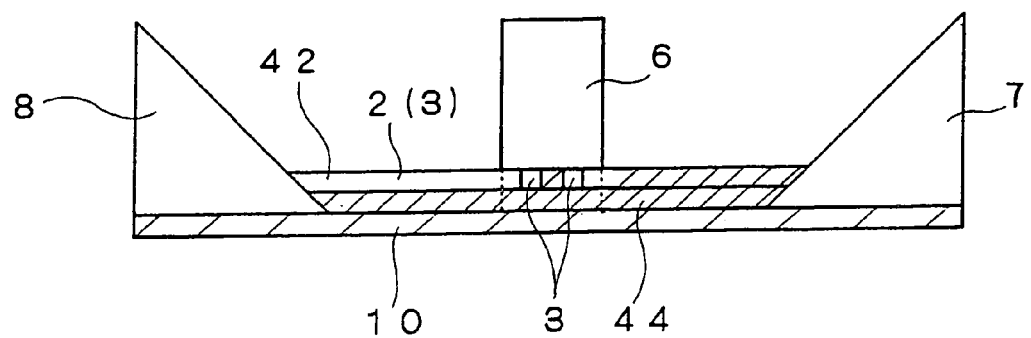

Then, as shown in FIGS. 4A and 4B, in a step 2, the base 10 is spin-coated with the polysilane over the cladding layer 44 and then, the cores 2 and 3 are patterned on the spin-coated layer by an ultraviolet light. Then the base 10 is baked to form a core layer 42. In the core layer 42, areas that are masked and not irradiated with the ultraviolet light form the cores 2 and 3 and an area irradiated with ultraviolet light is reduced in the refractive index to form the cladding 4. The cladding 4 in the core layer 42 is integrated with the cladding layer 44 to form the cladding 4 surrounding the cores 2 and 3.

Figure 5A:
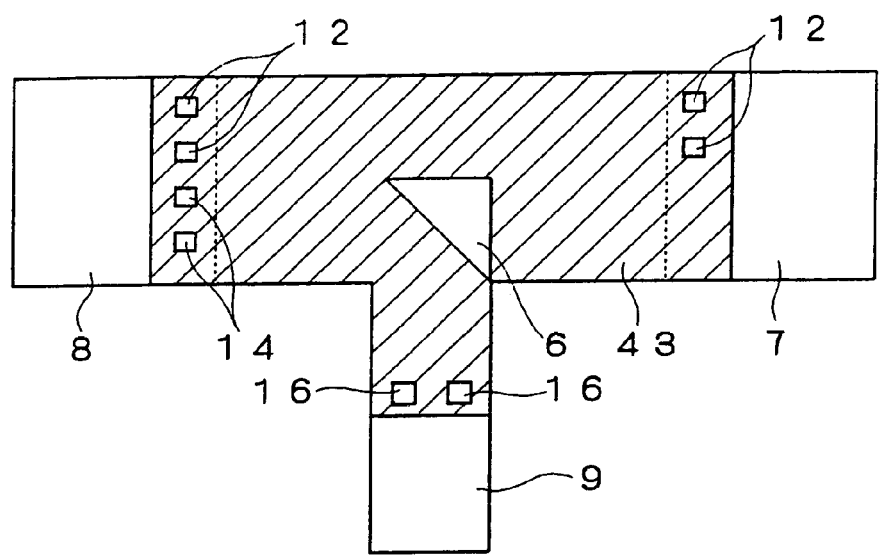
FIGS. 5A and 5B are explanatory diagrams showing a third step of the process for producing the three-dimensional optical waveguide of the first embodiment.
Figure 5B:
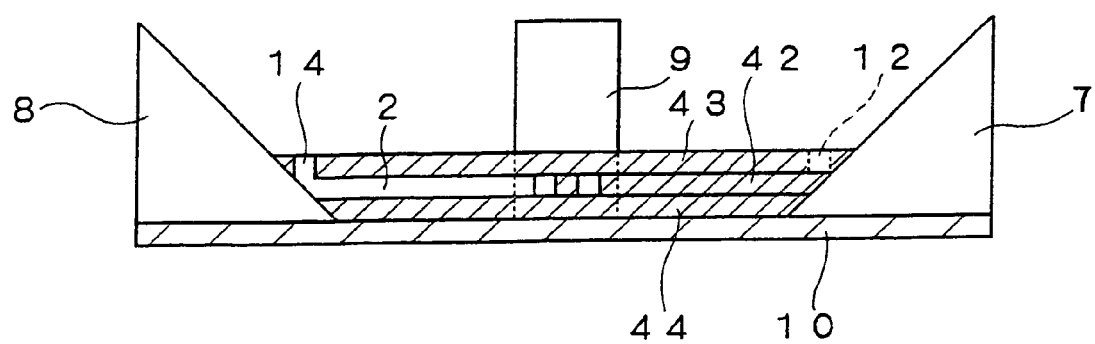

Then, as shown in FIGS. 5A and 5B, in a step 3, the base 10 is spin-coated with the polysilane over the core layer 42 and then, irradiated with the ultraviolet light to form the inlet-outlet optical paths 12, 14, and 16, all of which are an optical path in the Z-direction. After patterning, the base 10 is baked to form a core layer 43. In the core layer 43, the area irradiated with the ultraviolet light is reduced in refractive index thereof to form the cladding 4. The cladding 4 in the core layer 43 is integrated into the cladding 4 in the core layer 42.

Then, by repeating the steps 2 and 3, the three-dimensional optical waveguide 100 shown in FIG. 1 is completed.

As described previously, the cores 2 and 3 are disposed in two rows in the X- or Y-direction and four layers in the Z-direction and thus, eight cores 2 and eight cores 3 are disposed. Further, the inlet-outlet optical paths 12 are connected to both ends of each of the eight cores 2. Similarly, the inlet-outlet optical paths 14 and 16 are connected to each end respectively, of each of the eight cores 3.

Accordingly, in the three-dimensional optical waveguide 100, between one inlet-outlet portion 20 and the other inlet-outlet portion 20, the cores 2 and the inlet-outlet optical paths 12 form eight of first optical paths extending in the X-direction. Between the inlet-outlet portions 22 and 24, eight of second optical paths, which bend 90 degrees, via mirror 6, from the X-direction to the Y-direction, are also formed by the cores 3, the inlet-outlet optical paths 14, and the inlet-outlet optical paths 16.

Figure 19A:
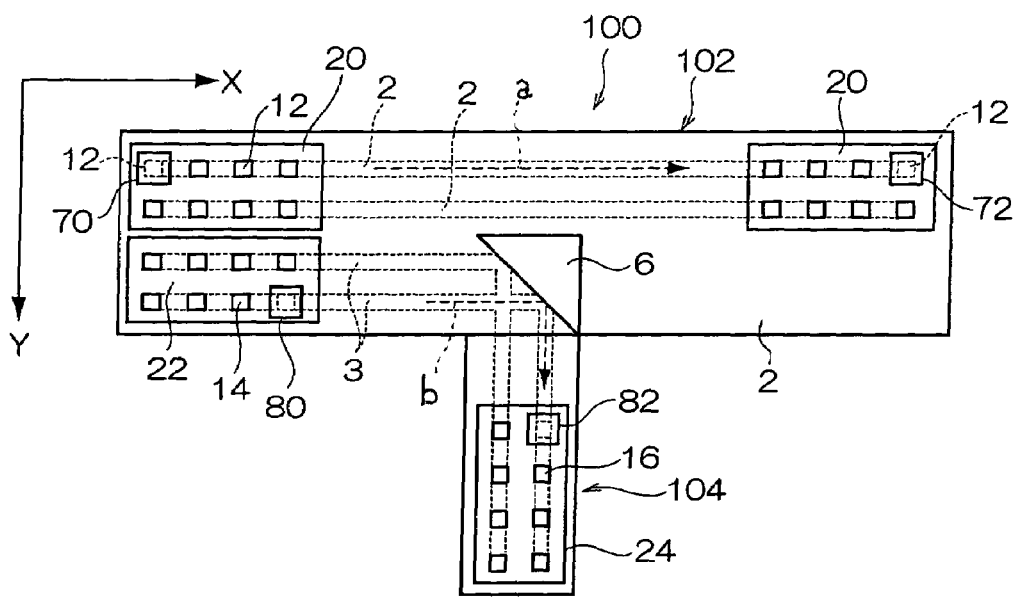
FIGS. 19A and 19B are schematic views showing the constitution and the function of an optical communicating system comprising the optical wave guide shown in FIGS. 1A, 1B, and 2, a light-emitting device that is attached on an inlet-outlet portion provided at one end of a main optical wave guide of the optical wave guide, and a light-receiving device that is attached on an inlet-outlet portion provided at the other end thereof.
Figure 19B:
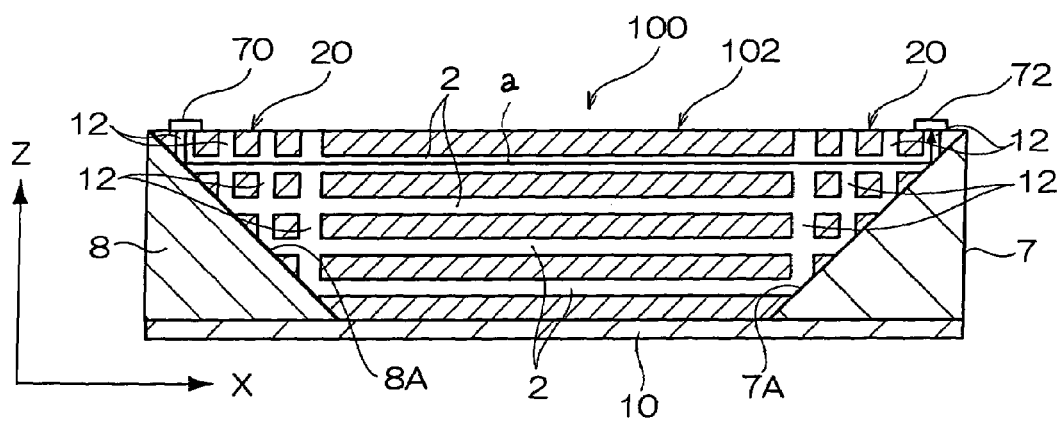

Accordingly, by attaching a light-emitting face of a light emitting-device 70 on the inlet-outlet portion 20 provided at one end of the main optical waveguide 102 and attaching a light-receiving face of a light-receiving device 72 on the inlet-outlet portion 20 provided at the other end of the main optical waveguide 102, light emitted from the light-emitting face of the light emitting-device 70 is injected to one inlet-outlet optical path 12, reflected by the reflective face 8A of the mirror 8 to be led into one core 2, then reflected by the reflective face 7A of the mirror 7 to be led into the other inlet-outlet optical path 12 that is extending along the X-direction, and then, injected into the light-receiving face of the light receiving device 72, as shown by an arrow 'a' in the FIGS. 19 A and 19B.

On the other hand, by attaching a light-emitting face of a light emitting-device 80 on the inlet-outlet portion 22 provided adjacent to the inlet-outlet portion 20 and attaching a light-receiving face of a light-receiving device 82 on the inlet-outlet portion 24 provided at the end of the branch optical waveguide 104, a light emitted from the light-emitting face of the light emitting-device 80 is injected into one inlet-outlet optical path 14, reflected by the reflective face 8A of the mirror 8 to be led into one core 3 as shown an arrow 'b' in FIGS. 19A and 20A. The light is reflected by the reflective surface 6A of the Mirror 6 and changes the direction thereof from the X-direction to the Y direction and is led into the core 3 in the branch optical waveguide 104 as shown by the arrow 'b' in FIG. 20B. Then, the light is reflected by the reflective face 9A of the mirror 9 to be led into an inlet-outlet optical path 16. The light is transmitted through the inlet-outlet optical paths 16 and injected into the light-receiving face of the light-receiving device 82.

Accordingly, by putting the light-emitting surface of the light-emitting device 70 or 80 on the inlet-outlet portion 20, 22, or 24, the light emitted by the light-emitting device can be led into the three-dimensional optical waveguide 100, and by putting the light-receiving surface of the light-receiving device 72 or 82 on the inlet-outlet portion 20, 22, or 24, the light injected into the three-dimensional optical waveguide 100 can be received. Consequently, there is no necessity of connecting the light-emitting device and the light-receiving device with the three-dimensional optical waveguide 100 by an optical connecting device such as a photo-coupler.

2. A Second Embodiment

A different example of the three-dimensional optical waveguide of the present invention is described in the following.

FIG. 6A shows a plan view of a three-dimensional optical waveguide 200 of a second embodiment, and FIG. 6B and FIG. 6C show sectional views thereof sectioned along the X-Y plane and the Y-Z plane, respectively. In FIG. 6A and the following figures, the reference numbers same as those in FIGS. 1A, 1B, and 2 show the same component shown in FIGS. 1A, 1B, and 2.

As shown in FIGS. 6A to 6C, the cores 2 extending in the X-direction in four rows are disposed in four layers in the Z-direction. Thus, sixteen cores 2 are formed.

A cladding 4 having a smaller refractive index surrounds the cores 2.

At each end of the three-dimensional optical waveguide 200, mirrors 7 and 8, which convert a direction of optical paths formed by the cores 2 from the X-direction to the Z-direction, are disposed. The mirrors 7 and 8 are provided so that reflective faces 7A and 8A, both of which are inclined surfaces, face each other. The mirrors 7 and 8 correspond to the optical path converting device of the three-dimensional optical waveguide of the present invention.

A base 10 is disposed on the bottom face of the three-dimensional optical waveguide 200.

At both ends of the cores 2, inlet-outlet optical paths 12 are formed in the Z-direction which intersects the cores 2 at the reflecting face 7A of the mirror 7 and at the reflecting face 8A of the mirror 8.

The top surfaces of the inlet-outlet optical paths 12 are exposed at the upper surface of the three-dimensional optical waveguide 200 to form inlet-outlet portions 20.

A process for producing the three-dimensional optical waveguide 200 is described in the following.

Figure 7A:
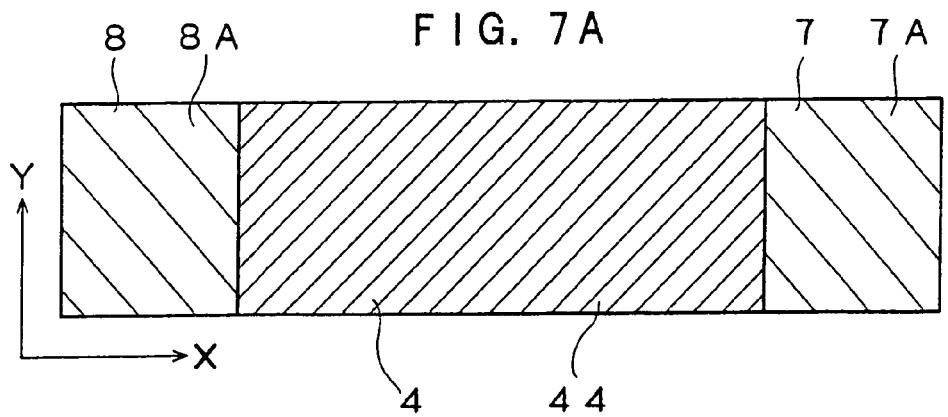
FIGS. 7A to 7D are explanatory diagrams showing a first and a second steps of a process for producing the three-dimensional optical waveguide of the second embodiment, respectively.
Figure 7B:
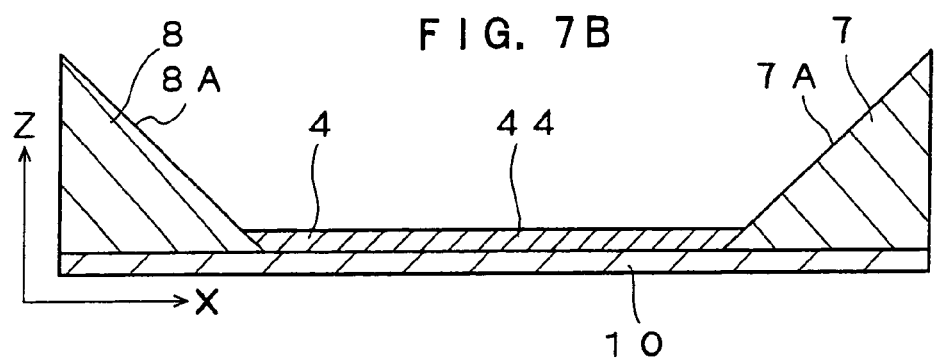

Firstly, as shown in FIGS. 7A and 7B, in a step 1, the mirrors 7 and 8 are placed and fixed on the base 10 so that the reflective faces 7A and 8A face each other, and then, the base 10 is spin-coated with, for example but not limited to, polysilane and baked to form a cladding layer 44.

Figure 7C:
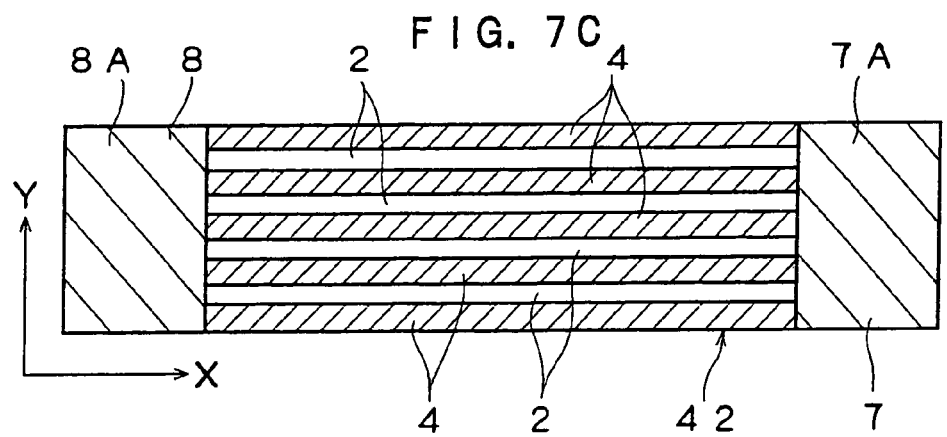
Figure 7D:
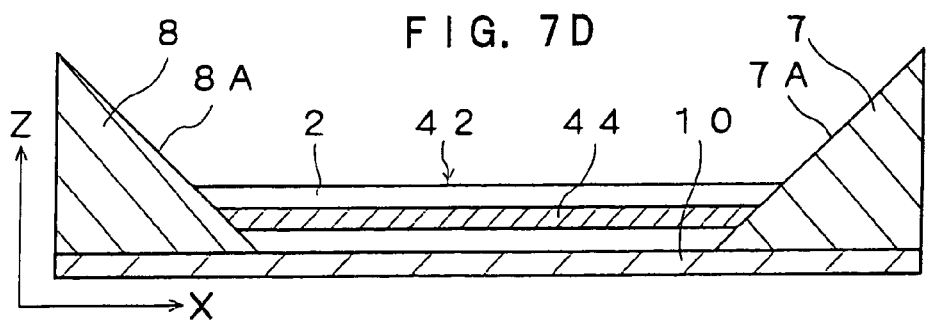

Then, as shown in FIGS. 7C and 7D, in a step 2, the cladding layer 44 formed in the step 1 is spin-coated with polysilane over, and then, an ultraviolet light patterns the cores 2. After patterning the cores 2, the base 10 is baked. Thus, a core layer 42, wherein the cores 2 and the cladding 4 are disposed alternatingly and extend in the X-direction, is formed.

Figure 8A:
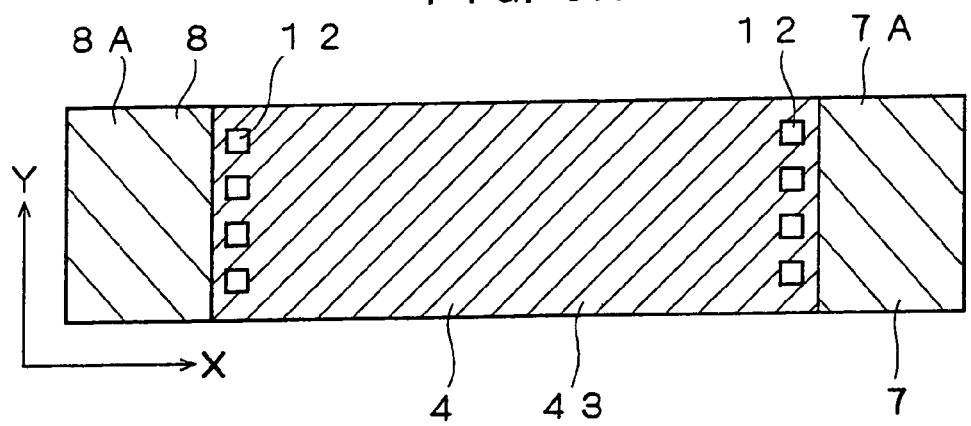
FIGS. 8A and 8B are explanatory diagrams showing a third step of a process for producing the three-dimensional optical waveguide of the second embodiment.
Figure 8B:
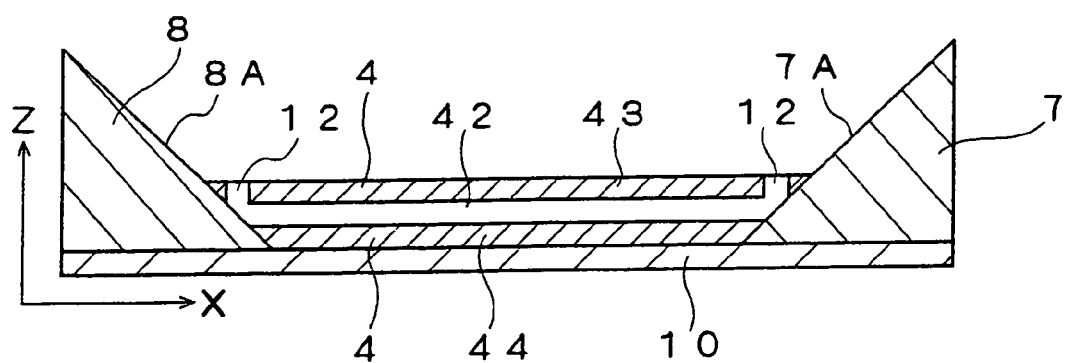

Then, as shown in FIGS. 8A and 8B, in a step 3, the core layer 42 formed in the step 2 is spin-coated with polysilane over, and then, an ultraviolet light on both ends of the cores 2 patterns the inlet-outlet optical paths 12. After patterning the inlet-outlet optical paths 12, the base 10 is baked to form a core layer 43 wherein four inlet-outlet optical paths 12 are disposed at both ends of the cladding 4.

Figure 9A:
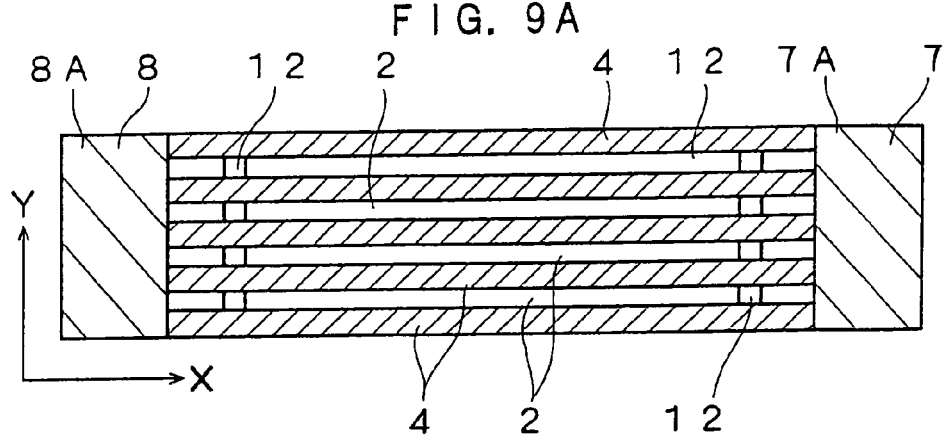
FIGS. 9A and 9B are explanatory diagrams showing a fourth step of a process for producing the three-dimensional optical waveguide of the second embodiment.
Figure 9B:
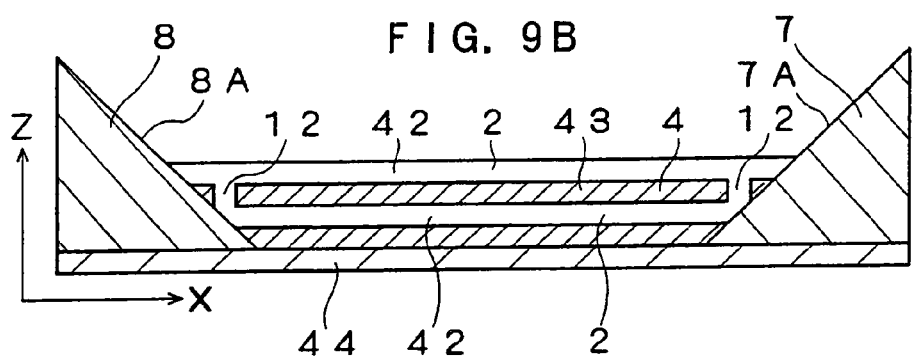

After forming the core layer 43, as shown in FIGS. 9A and 9B, in a step 4, the core layer 43 in the step 3 is spin-coated with polysilane over, and then, the cores 2 are patterned by an ultraviolet light. After pattering the cores 2, the base 10 is baked to form a core layer 42, wherein the cores 2 and the cladding 4 are disposed alternatingly in-direction and extend in the X-direction, is formed.

Figure 9C:
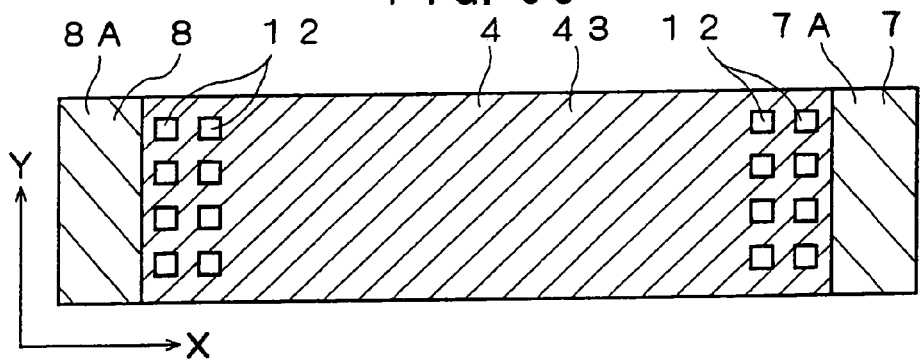
FIGS. 9C and 9D are explanatory diagrams showing a fifth step of the process for producing the three-dimensional optical waveguide of the second embodiment.
Figure 9D:
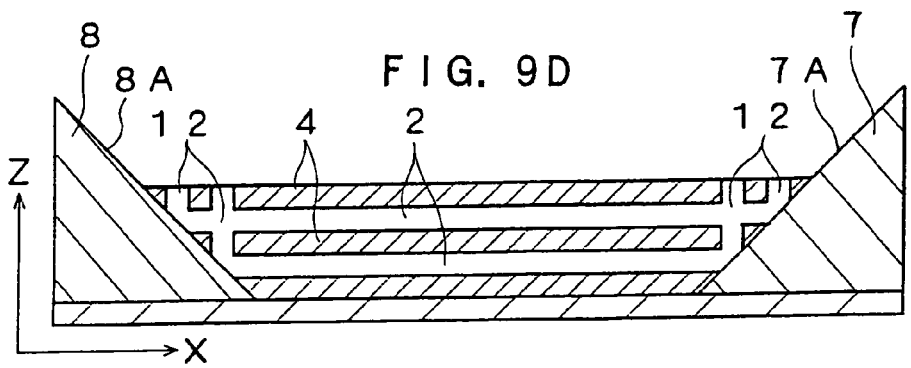

Further, as shown in FIGS. 9C and 9D, in a step 5, the core layer 42 (FIG. 9B) formed in the step 4 is spin-coated with polysilane, and then the inlet-outlet optical paths 12 are patterned by an ultraviolet light on both ends of the cores 2. Not only the inlet-outlet optical paths 12 leading to the cores 2 formed in the step 2 but also the inlet-outlet optical paths 12 leading to the cores 2 formed in the step 4 are formed, and consequently, eight inlet-outlet optical paths 12 are formed at each ends of a core layer 43. After forming the inlet-outlet optical paths 12, the base 10 is baked to form the core layer 43 having eight inlet-outlet optical paths 12 at each end of the cladding 4.

By repeating the steps 4 and 5, the three-dimensional optical waveguide 200 can be formed.

In the three-dimensional optical waveguide 200, light introduced from one inlet-outlet portion 20 is led through the inlet-outlet optical paths 12 and reflected by one of the mirrors 7 and 8 and led into the cores 2. The light passing through the cores 2 is reflected by mirrors 7 and 8 is led into the inlet-outlet optical paths 12 and led out from the other inlet-outlet portion 20.

Thus, by leading light into one inlet-outlet portions 20, the light can be led out from the other inlet-outlet portions 20. Further, since the inlet-outlet portions 20 are disposed on the top surface of the three-dimensional optical waveguide 200, a light-emitting device and a light-receiving device can be packaged on the inlet-outlet portions 20.

Additionally, the cores 2 are provided in four rows and in four layers and thus, a complicated optical distribution using a large number of light-emitting devices and light-receiving devices can be easily made.

3. A Third Embodiment

A further different example of the three-dimensional optical waveguide of the present invention is described in the following.

Figure 10A:
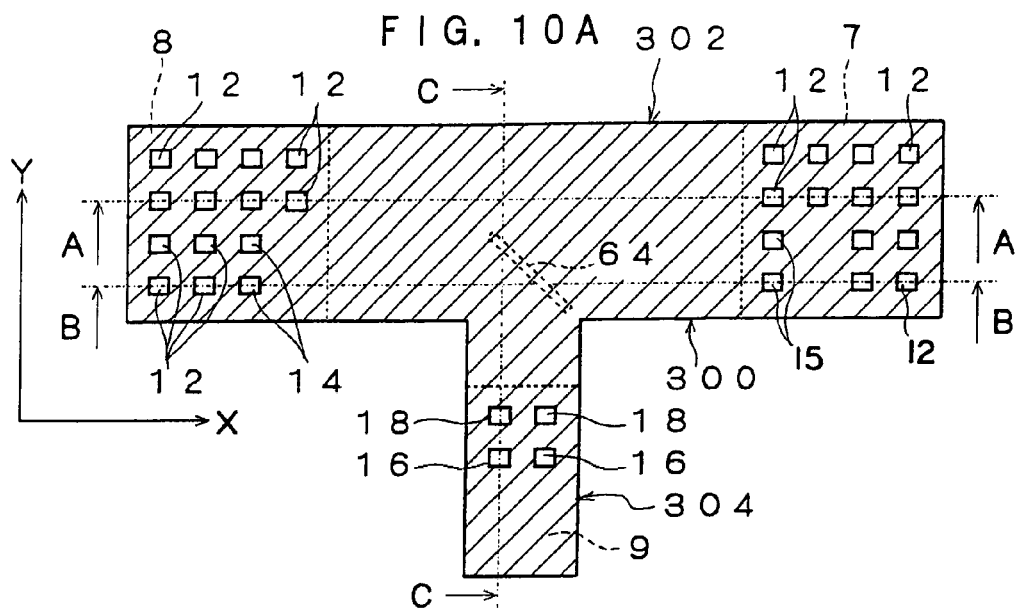
FIG. 10A is a plan view showing a constitution of a three-dimensional optical waveguide of a third embodiment.
Figure 10B:
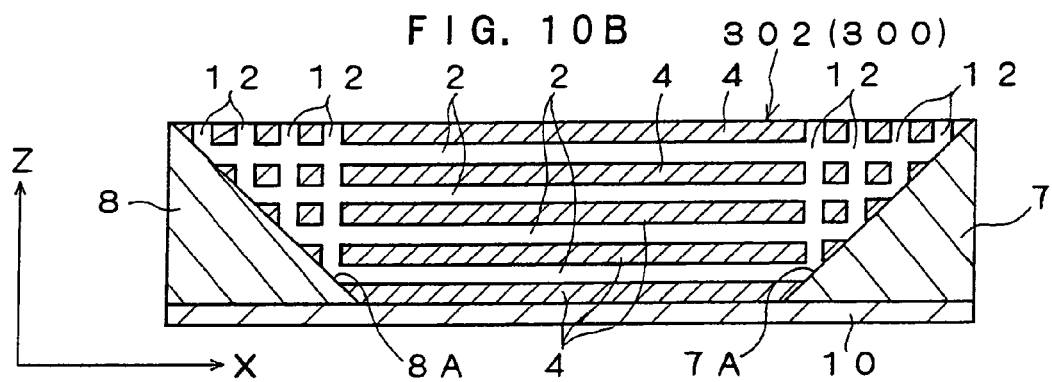
FIGS. 10B and 10C are sectional view of the three-dimensional optical waveguide sectioned along the X-Z plane.
Figure 10C:
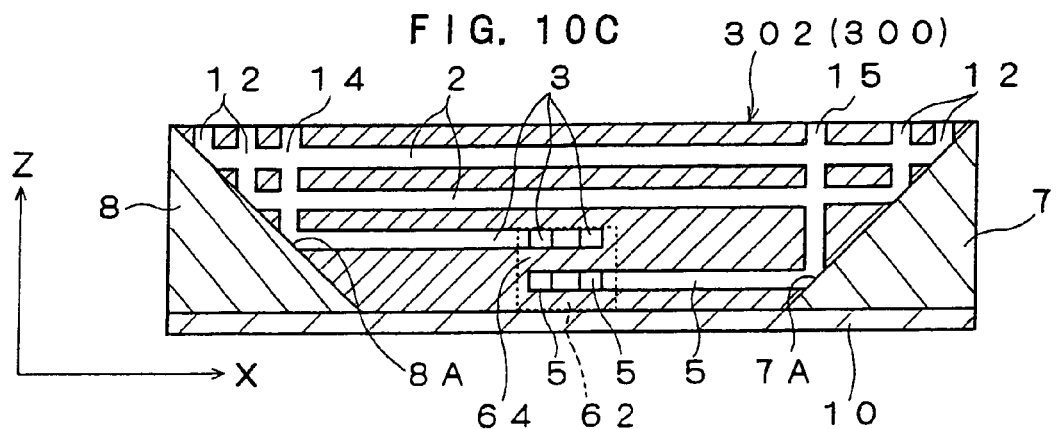
Figure 11:
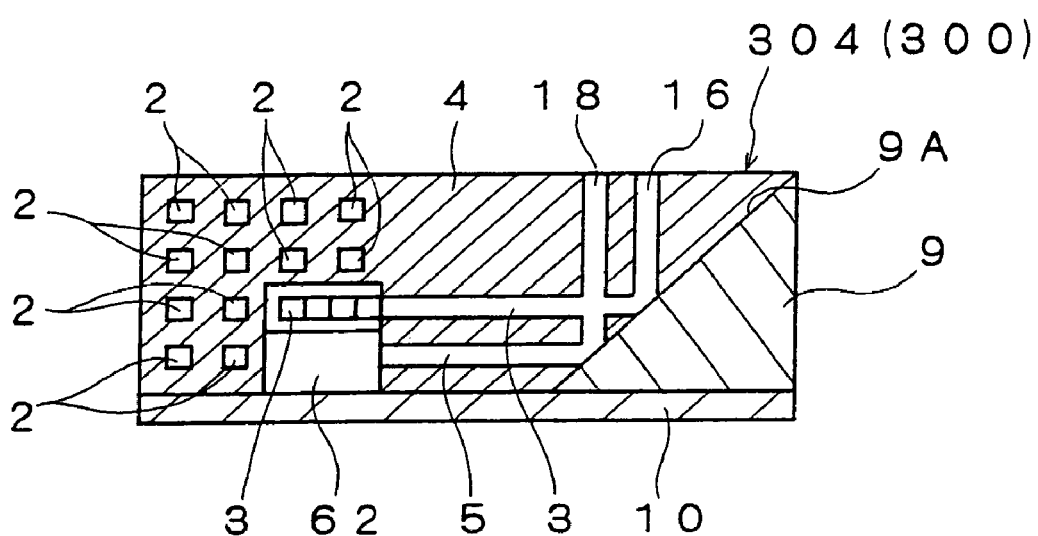
FIG. 11 is a sectional view of the three-dimensional optical waveguide of the third embodiment sectioned along the Y-Z plane, showing a constitution of a branch optical waveguide thereof.

FIG. 10A shows a plan view of a three-dimensional optical waveguide 300 of a third embodiment, FIG. 10B shows a sectional view thereof sectioned along the plane A—A the is a plane in the X-Z direction, and FIG. 10C shows sectional view thereof sectioned along a plane B—B that is a plane in the X-Z direction. FIG. 11 shows a sectional view of the three-dimensional optical waveguide 300 sectioned along a plane C—C that is a plane in the Y-Z direction. In FIG. 10A and the following figures, the same reference numbers same as those in FIGS. 1A, 1B, and 2 show the same component shown in FIGS. 1A, 1B, and 2.

As shown in FIGS. 10A to 10C, the three-dimensional optical waveguide 300 comprises a main optical waveguide 302 and a branch optical waveguide 304 branching from a central part of the main optical waveguide 302 in Y direction.

Both the main optical waveguide 302 and the branch optical waveguide 304 are formed on a base 10.

In the side of the main optical waveguide opposite to the side where the branch optical waveguide 304 branches, the cores 2 extending in the X-direction are formed in two rows and in four layers. On the other hand, in the side of the main optical waveguide 302 where the branch optical waveguide 304 branches, the cores 2 formed in two rows and in two layers. Below the cores 2, cores 3 and 5, both of which bend from the X-direction into the Y-direction at the branch optical waveguide 304, are formed. The cores 3 extend from the left end of the main optical waveguide 302 to the right as shown in FIGS. 10A to 10C and bend at the branch optical waveguide 304 from the X-direction into the Y-direction. On the other hand, the cores 5 extend from the right end of the main optical waveguide 302 the left and bend at the branch optical waveguide 304 from the X-direction into the Y-direction. The cores 3 are formed above the cores 5. A cladding 4 having a lower refractive index surrounds all of the cores 2, 3, and 5.

Mirrors 62 and 64, which are an optical path converting device converting an optical path in X direction to Y direction, are buried inside of the main optical waveguide 302 at a point where the branching the guide 304 branches. The mirrors 62 and 64 are plane mirrors. The mirror 62 is disposed at a point where the cores 5 bend from the X-direction to the Y-direction. The mirror 64 is disposed at a point where the cores 3 bend from the X-direction to the Y-direction.

Mirrors 7 and 8 are provided at the right end and the left end of the main optical waveguide 302, respectively. In addition, a mirror 9 is disposed at a tip of the branch optical waveguide 304.

The cores 2 lead to the inlet-outlet optical paths 12 at both ends. On the other hand, the portions of the cores 3 extending in the main optical waveguide 302 lead to the inlet-outlet optical paths 14 at the ends thereof and the portions of the cores 3 extending in the branch optical waveguide 304 lead to the inlet-outlet optical paths 18 at the ends thereof. Further, the portions of the cores 5 extending in the main optical waveguide 302 lead to the inlet-outlet optical paths 15 at the end thereof, and the portions of the cores 5 extending in the branch optical waveguide 304 are connected to the inlet-outlet optical paths 16 at the ends thereof. The inlet-outlet optical paths 12, 14, 15, 16, and 18 are optical paths extending in the Z-direction and having the same refractive index as that of the cores 2, 3, and 5.

The mirrors 7 and 8 convert optical paths between the cores 2 and the inlet-outlet optical paths 12. In the cores 3, optical paths are converted to the inlet-outlet optical paths 14 by the mirror 8 and are converted to the inlet-outlet optical paths 16 by the mirror 9. In the cores 5, optical paths are converted to the inlet-outlet optical paths 15 by the mirror 7 and are converted to the inlet-outlet optical paths 18 by the mirror 9.

A process for producing the three-dimensional optical waveguide 300 is described in the following.

Figure 12A:
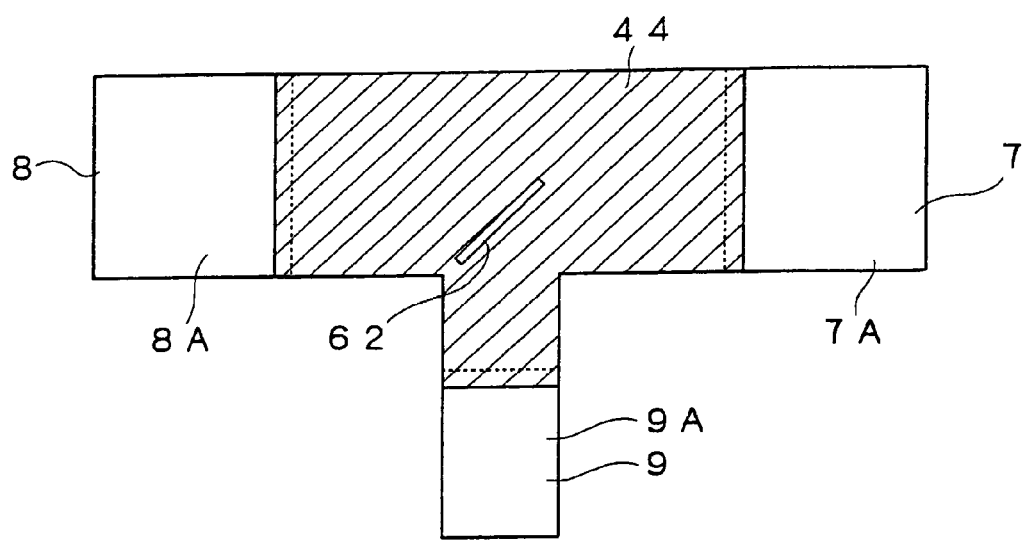
FIGS. 12A and 12B are explanatory diagrams showing a first step of a process for producing the three-dimensional optical waveguide of the third embodiment.
Figure 12B:
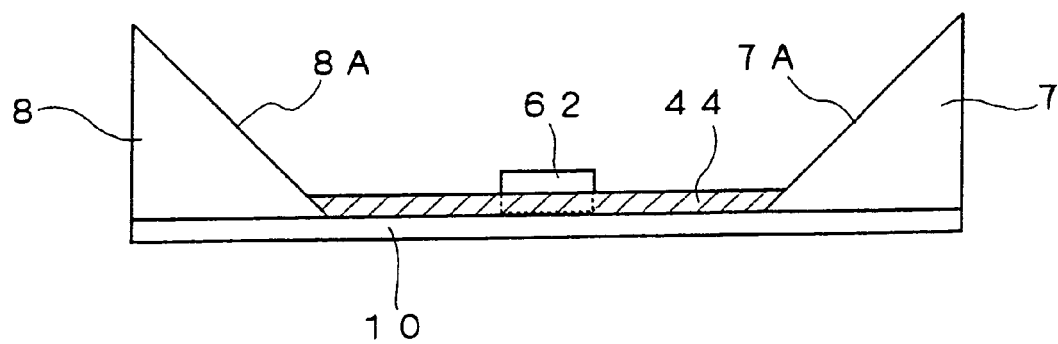

Firstly, as shown in FIGS. 12A and 12B, in a step 1, the mirrors 7, 8, 9, and 62 are placed and fixed on the base 10, and then, the base 10 is spin-coated with polysilane and baked to form a cladding layer 44.

Figure 13:
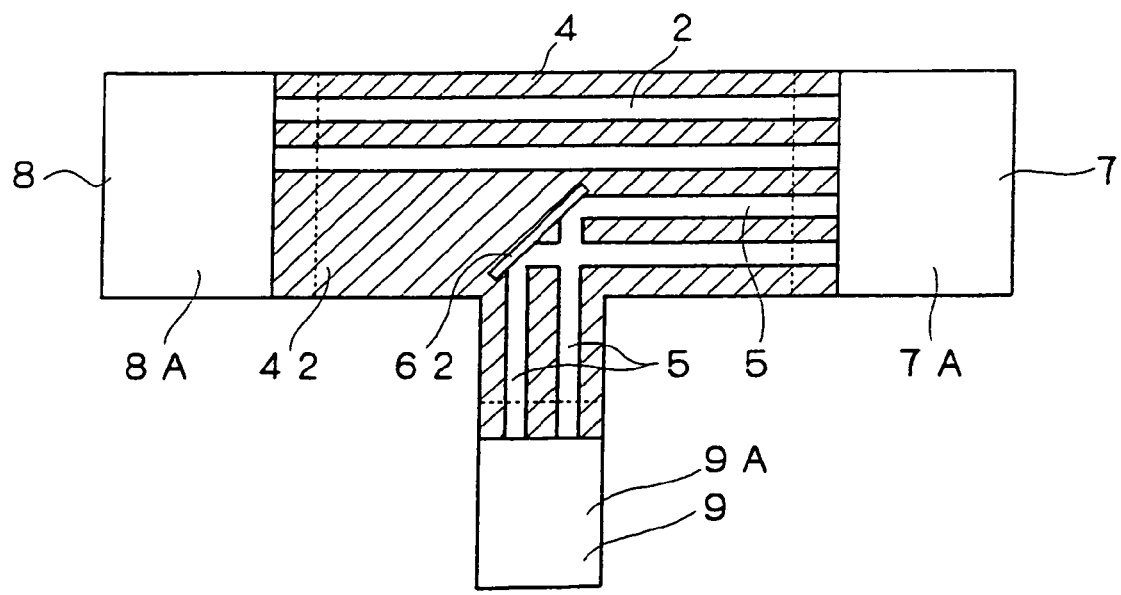
FIG. 13 is an explanatory diagram showing a second step of the process for producing the three-dimensional optical waveguide of the third embodiment.

Then, as shown in FIG. 13, in a step 2, the cladding layer 44 formed in the step 1 is spin-coated, for example but not limited to, with polysilane, and then, the cores 2 and 5 are patterned in two rows, by an ultraviolet light, respectively. After patterning the cores 2 and 5, the base 10 is baked to form a core layer 42. In the core layer 42 thus formed, exposed areas turn into the cladding 4.

Figure 14:
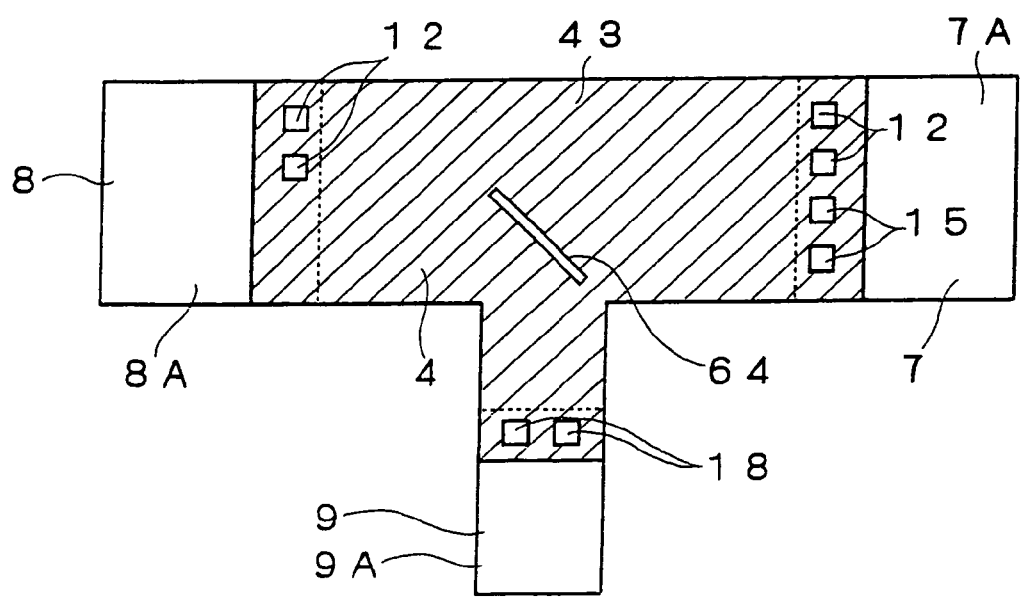
FIG. 14 is an explanatory diagram showing a third step of the process for producing the three-dimensional optical waveguide of the third embodiment.

Then, as shown in FIG. 14, in a step 3, the mirror 64 is placed and fixed on the core layer 43, and then, the core layer 43 is spin-coated with a polysilane. Then, ultraviolet light patterning is done to form the inlet-outlet optical paths 12 on each end of the cores 2, to form the inlet-outlet optical paths 15 on one end of the cores 5, and to form the inlet-outlet optical paths 18 on the other end thereof. After the ultraviolet light patterning, the base 10 is baked to form a core layer 43. In the core layer 43, exposed areas turn into the cladding 4.

Figure 15:
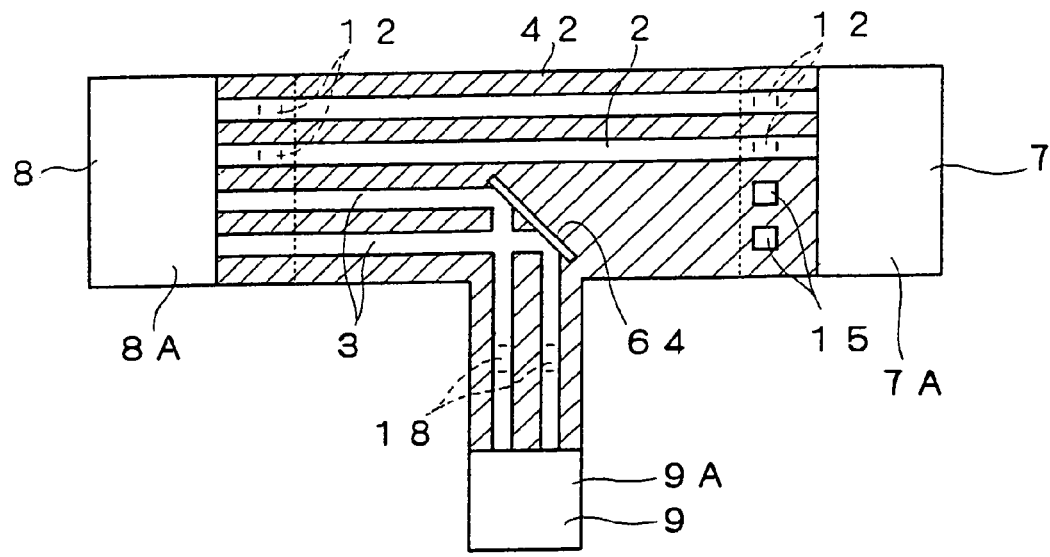
FIG. 15 is an explanatory diagram showing a fourth step of a process for producing the three-dimensional optical waveguide of the third embodiment.

As shown in FIG. 15, in a step 4, the core layer 42 is spin-coated with polysilane, and then, the cores 2 and 3 are patterned in two rows by an ultraviolet light, respectively. The inlet-outlet optical paths 15 are simultaneously patterned. Then, the base 10 is baked to form a core layer 42. In the core layer 42, exposed areas turn into the cladding 4.

Figure 16:
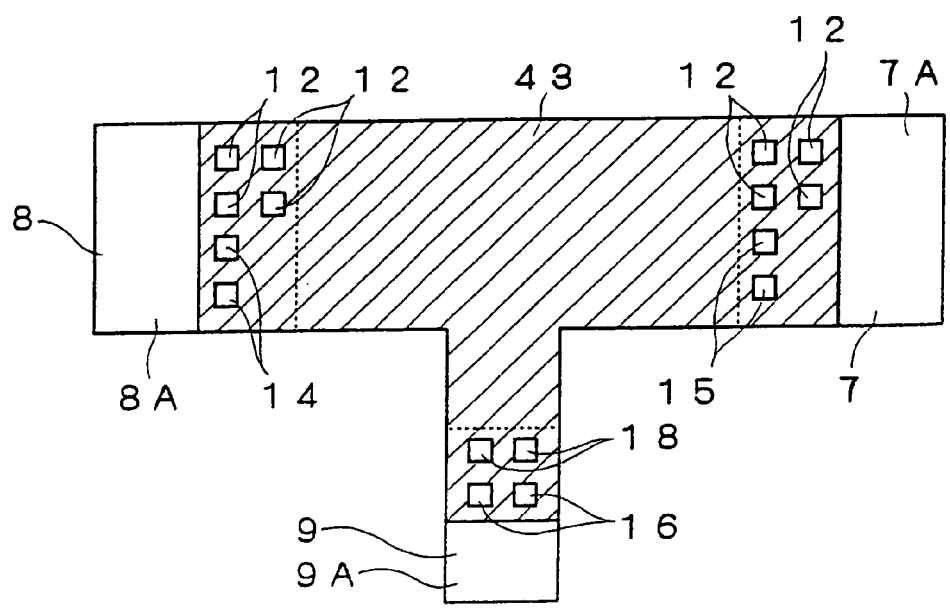
FIG. 16 is an explanatory diagram showing a fifth step of the process for producing the three-dimensional optical waveguide of the third embodiment.

As shown in FIG. 16, in a step 5, the core layer 43 is spin-coated with polysilane, and then, ultraviolet light patterning is done to form the inlet-outlet optical paths 12 on each end of the cores 2, to form the inlet-outlet optical paths 14 on one end of the cores 3, and to form the inlet-outlet optical paths 16 on the other end thereof. The inlet-outlet optical paths 15 and 18 are also patterned. After patterning, the core 10 is baked to form a core layer 43. In the core layer 42, exposed areas turn into the cladding 4.

Figure 17:
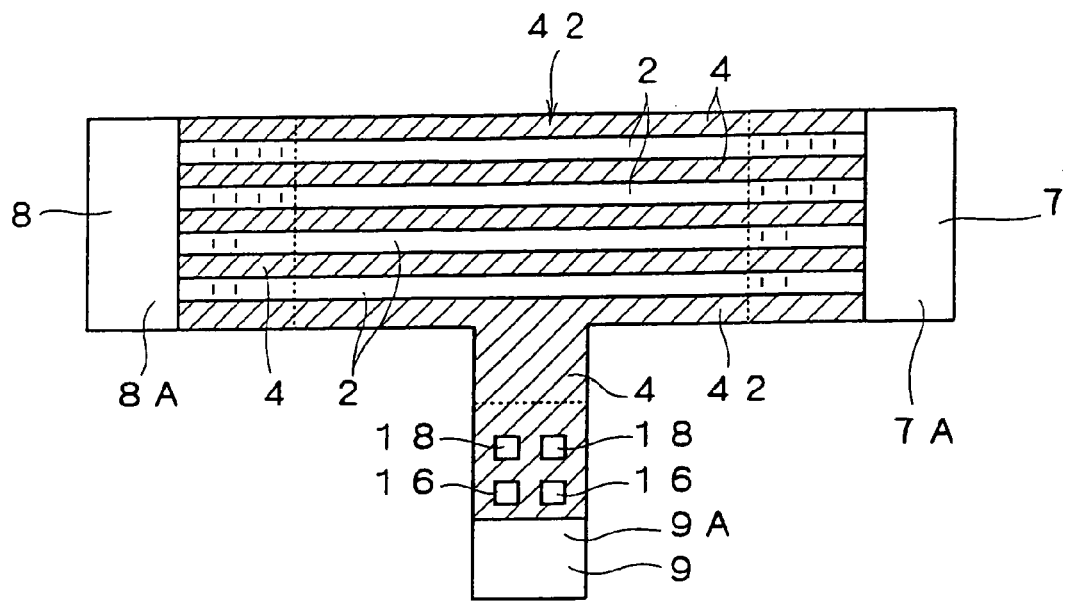
FIG. 17 is an explanatory diagram showing a sixth step of the process for producing the three-dimensional optical waveguide of the third embodiment.
Figure 18:
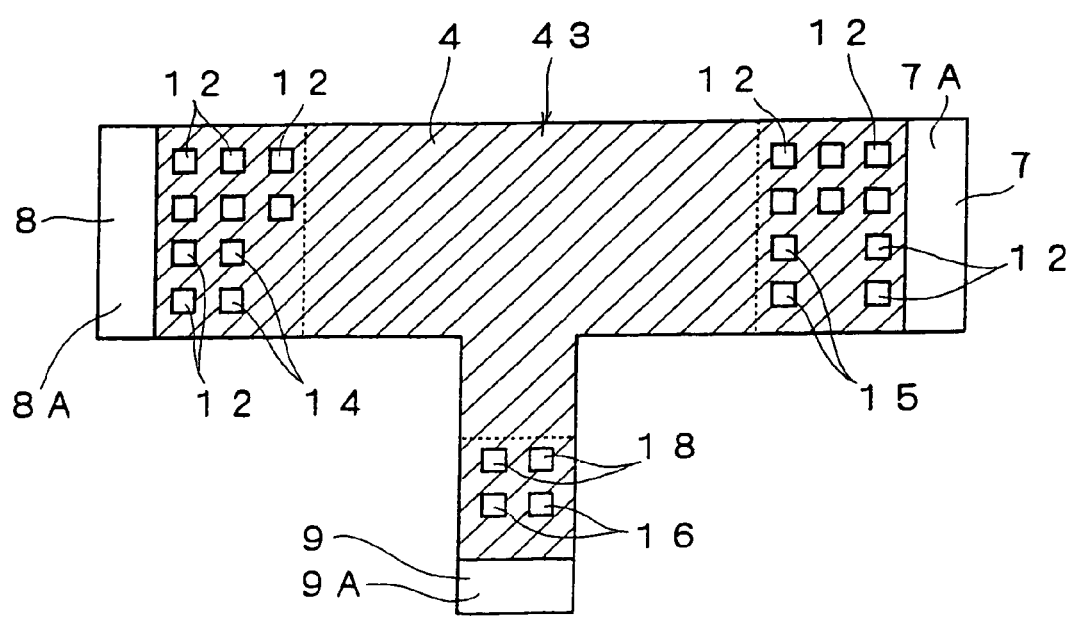
FIG. 18 is an explanatory diagram showing a seventh step of a process for producing the three-dimensional optical waveguide of the third embodiment.

In a step 6, as shown in FIG. 17, the core layer 42 is spin-coated with polysilane. Then, patterning is done under an ultraviolet light to form the cores 2 in 4 rows. Then, the base 10 is baked to form a core layer 42.

In a step 7, as shown in Fig, 18, the base 10 is coated with polysilane over the core layer 43. Then by ultraviolet light patterning, the inlet-outlet optical paths 12 are formed at both ends of each of the cores 2 formed in four rows. Simultaneously, the inlet-outlet optical paths 14, the inlet-outlet optical paths 15, the inlet-outlet optical paths 16, and the inlet-outlet optical paths 18 are formed. After patterning, the base 10 is baked to form a core layer 43.

Then, the steps 6 and 7 are repeated alternatingly to form another layer of the four row cores 2, the inlet-outlet optical paths 12, the inlet-outlet optical paths 14, the inlet-outlet optical paths 15, the inlet-outlet optical paths 16, and the inlet-outlet optical paths 18 to complete the three-dimensional optical waveguide 300.

In the three-dimensional optical waveguide 300, light introduced from the inlet-outlet optical paths 12 locating at the left end of the main optical waveguide 302 is reflected by the mirror 8 and is led to the left end of the main optical waveguide 302. Then, the light is reflected by the mirror 7 at the right end of the cores 2 and is led out from the inlet-outlet optical paths 12 locating at the right end of the main optical waveguide 302.

On the other hand, light introduced from the inlet-outlet optical paths 14 is reflected by the mirror 8 and led into the cores 3. Then, the light is reflected by the mirror 64 to be led into the branch optical waveguide 304 and then, the light is reflected by the mirror 9 provided at the branch optical waveguide 304 to be led out from the inlet-outlet optical paths 16.

Light introduced from the inlet-outlet optical paths 15 is reflected by the mirror 7 and led into the cores 5. Then, the light is reflected by the mirror 62 to be led into the branched optical waveguide 304. The light is then reflected by the mirror 9 and led out from the inlet-outlet optical paths 18.

Thus, in the three-dimensional optical waveguide 300, an optical path for transmitting light can be chosen from three different optical paths.

Additionally, eight optical paths through the cores 2, two optical path through the cores 3, and two optical paths through the cores 5 are formed in the three-dimensional optical waveguide 300. Therefore, by using each optical path for transmitting optical data, a mass data communication is possible.

Further, by contacting a light-emitting face of a light-emitting device to any of the inlet-outlet optical paths 12, 14, 15, 16, 18, light can be led in the three-dimensional optical waveguide 300. As well as the light led in the three-dimensional optical waveguide 300 can be detected by contacting a light-receiving face of a light-receiving device to any of the inlet-outlet optical paths 12, 14, 15, 16, 18. Accordingly, a complicated optical distribution wherein a large number of light-emitting devices and light-receiving devices are involved can be drastically simplified.

As described so far, a first aspect of the three-dimensional optical waveguide provided by the present invention includes plural cores that are disposed in a specified direction at least in two rows and in two layers, a cladding in which the cores are buried and having a refractive index different from that of the cores, and an optical path converting device disposed at least at a part of the cores and converting a direction of an optical path formed by the cores to a direction different from the specified direction.

In the three-dimensional optical waveguide of the first aspect, at least a part of optical paths formed by the core are bent to a direction other than the specified direction.

Therefore, in the three-dimensional optical waveguide in which a part of optical paths are bent by the optical path converting device, a first optical path not converted by the optical path converting device and a second optical path converted by the optical path converting device are integrated.

Additionally, a three-dimensional optical waveguide in which all optical paths are bent by the optical path converting device is also included in the three-dimensional optical waveguide of the first aspect.

In the above three-dimensional optical waveguides, positions of an optical inlet and an optical outlet can be easily adjusted to a position of an optical device such as a light-emitting device or a light-receiving device of an optical communication system.

The optical path converting device includes a mirror deposited at a specific position on a side wall of the core. The optical path converting device can also be a mirror disposed at a predetermined position of the core. The optical path can be converted by bending the core at a predetermined point.

A three-dimensional optical waveguide of a second aspect of the present invention is the three-dimensional optical waveguide of the first aspect and further includes an inlet-outlet optical path that intersects at least one of the cores and leads light in or out of the cores. The optical path converting device converts an optical path direction between the cores and the inlet-outlet optical path.

In the three-dimensional optical waveguide of the second aspect, light led from a first optical inlet-outlet portion is led to one end of the cores through a first inlet-outlet optical path and the direction of the light is changed by the optical path converting device, then, the light is led out from the other end of the cores through a second inlet-outlet optical path and a second optical inlet-outlet portion.

Accordingly, by introducing light from a light-emitting device into the first optical inlet-outlet portion and by receiving the light led out of the second optical inlet-outlet portion with a light-receiving device, light can be transmitted from the light-emitting device to the light-receiving device through the three-dimensional optical waveguide. Thus, the light-emitting device and the light-receiving device can be directly connected to the three-dimensional optical waveguide without using any optical couplers.

A three-dimensional optical waveguide of a third aspect of the present invention is the three-dimensional optical waveguide of the first or the second aspect, in which at least a part of the cores has at least one bending point bending to a direction different from the specified direction and the optical path converting device is disposed at the bending point.

In the three-dimensional optical waveguide, light led into the bending cores is bent by the optical path converting device at the bending point of the cores and transmitted within the core. On the other hand, light led into the non-bending cores goes inside of the non-bending cores in the specified direction.

Thus, the three-dimensional optical waveguide includes an embodiment in which bending optical paths are integrated with non-bending optical paths and an embodiment in which all optical paths bend.

A three-dimensional optical waveguide of a fourth aspect of the present invention is the three-dimensional optical waveguide of one of the first to the third aspects, in which at least one of the cores bends in a part of the layers of the cores.

In the three-dimensional optical waveguide of the fourth aspect, at least two types of optical paths, optical paths that bend and optical paths that do not bend, are integrated with each other and accordingly, a three-dimensional optical distribution can be formed only by connecting a light-emitting device and a light-receiving device to the three-dimensional optical waveguide.

A three-dimensional optical waveguide of a fifth aspect is the three-dimensional optical waveguide of one of the first to the third aspects of the present invention, in which at least one of the cores bends in all the layers of the cores.

In the three-dimensional optical waveguide of the fifth aspect, optical paths in at least two directions are formed in all the layers of the cores.

A three-dimensional optical waveguide of a sixth aspect is the three-dimensional optical path of the fourth or the fifth aspect, in which all the bending cores bend in the same direction.

In the three-dimensional optical waveguide, optical paths of different two directions are integrated with each other.

A three-dimensional optical waveguide of the seventh aspect is the three-dimensional optical waveguide of the fourth or the fifth aspect wherein some of the bending cores bend in a direction different from the direction of the rest of the bending cores.

The three-dimensional optical waveguide has cores extending in a first direction, cores bending in a second direction that is different from the first direction, and in addition, cores bending in a third direction that is different from the first and the second directions. Accordingly, optical paths of three different directions are integrated with each other in the three-dimensional optical waveguide.

A three-dimensional optical waveguide of an eighth aspect is the three-dimensional optical waveguide of one of the first to the seventh aspects, in which the optical path converting device is a mirror.

A three-dimensional optical waveguide of a ninth aspect is the three-dimensional optical waveguide of the eighth aspects, in which a light-reflecting face of the mirror is formed of a metallic surface or a dielectric multilayer film.

In the three-dimensional optical waveguide, a mirror is employed as the optical path converting device and thus, a direction of an optical path is reliably converted at a point where the core bents or a point between a core and an inlet-outlet optical path.

A three-dimensional optical waveguide of a tenth aspect is the three-dimensional optical waveguide of one of the first to the ninth aspect, in which the cores have a refractive index higher than the cladding.

A three-dimensional optical waveguide of an eleventh aspect is the three-dimensional optical waveguide of the first aspect, in which the optical path converting device includes plural optical path converting devices disposed at the respective parts of the cores, and the plural optical path converting devices are disposed at a different angle with each other.

For example, but not limited to, polysilane is recently attracting attention as a material for forming an optical waveguide has a property such that the refractive index thereof can be reduced by irradiating the material with ultraviolet lights.

The three-dimensional optical waveguide can be produced by a process including a step of coating a base with polysilane, a step of masking an area that is to be the core, a step of irradiating with ultraviolet light in accordance with a pattern of optical paths to form the cladding, and a step of heating at a temperature of about 250° C. (The appropriate temperature is different by materials.) to bake.

Thus, the cores do not need to be formed of a different material than the material forming the cladding. The cores neither need to be formed by doping. Consequently, the three-dimensional optical waveguide of this aspect can be easily produced.

Further aspect of the present invention is an optical communicating system including the three-dimensional optical waveguide of one of the first to the eleventh aspect, a light-emitting device optically connected to one end of at least one of the cores of the three-dimensional optical waveguide, and a light-receiving device optically connected to the other end of the core wherein the light-emitting device is optically connected.

The three-dimensional optical waveguide can be easily positioned in accordance with a position of an optical device or an electronic device, and accordingly, the formation of the optical communicating system is limited little or not by the configuration of the three-dimensional optical waveguide. Further, a three-dimensional optical wiring in which optical devices are three-dimensionally positioned can be easily formed.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A three-dimensional optical waveguide comprising:
   a plurality of cores that are disposed in a specified direction in at least two rows and at least two layers, each layer being disposed within a plane and being substantially parallel to each other;
   a cladding in which the cores are buried and having a refractive index different from that of the cores;
   a plurality of optical paths, each of which is formed within one of the layers by the cores;
   a first optical path converting device disposed at least at some of the cores and converting a direction of at least one of the optical paths to a direction different from the specified direction within the layer; and
   an inlet-outlet optical path that goes through the layers and intersects at least one of the cores and leads light into or out of the cores, a second optical path converting device converting the optical path direction of the at least one of the cores into the direction of the inlet-outlet optical path.

2. The three-dimensional optical waveguide of claim 1, wherein at least some of the cores have at least one bending point bending within the layer to a direction different from the specified direction and the first optical path converting device is disposed at the bending point.

3. The three-dimensional optical waveguide of claim 2, wherein at least one of the cores within at least one of the layers of the cores bends.

4. The three-dimensional optical waveguide of claim 2, wherein at least one of the cores within each of the layers of the cores bends.

5. The three-dimensional optical waveguide of claim 3, wherein all the bending cores bend in the same direction.

6. The three-dimensional optical waveguide of claim 4, wherein all the bending cores bend in the same direction.

7. The three-dimensional optical waveguide of claim 3, wherein some of the bending cores bend in a direction different from the direction of the rest of the bending cores.

8. The three-dimensional optical waveguide of claim 4, wherein some of the bending cores bend in a direction different from the direction of the rest of the bending cores.

9. The three-dimensional optical waveguide of claim 1, wherein each optical path converting device is a mirror.

10. The three-dimensional optical waveguide of claim 9, wherein a light-reflecting face of each mirror is one of a metallic surface and a dielectric multilayer film.

11. The three-dimensional optical waveguide of claim 1, wherein the cores have a refractive index higher than the cladding.

12. The three dimensional optical waveguide according to claim 1, wherein each of the optical path converting devices comprises a plurality of optical path converting devices being disposed at the respective parts of the cores, and wherein the plural optical path converting devices are disposed at a different angle with each other.

13. An optical communicating system comprising:
a three-dimensional optical waveguide comprising:
  a plurality of cores that are disposed in a specified direction in at least two rows and at least two layers, each layer being disposed within a plane and being substantially parallel to each other;
  a cladding in which the cores are buried and having a refractive index different from that of the cores;
  a plurality of optical paths, each of which is formed within one of the layers by the cores;
  a first optical path converting device disposed at least at a part of the cores and converting a direction of at least one of the optical paths to a direction different from the specified direction within the layer;
  an inlet-outlet optical path that goes through the layers and intersects at least one of the cores and leads light into or out of the cores, a second optical path converting device converting the optical path direction of the at least one of the cores into the direction of the inlet-outlet optical path;
a light-emitting device optically connected to one end of at least one of the cores of the three-dimensional optical waveguide; and
a light-receiving device optically connected to the other end of the core to which the light-emitting device is optically connected.

14. A three-dimensional optical waveguide comprising:
a cladding in which cores are buried and which has a refractive index different from that of the cores, said cladding including at least two layers, each layer being disposed within a plane and being substantially parallel to each other;
a plurality of cores each having a first and a second end, wherein at least two of said cores are disposed in each layer in a specified direction;
a plurality of optical paths, each of which is formed within one of the layers by the cores;
an inlet-outlet optical path that goes through the layers and intersects the cores at each end and leads light into or out of the cores;
a first optical path converting device disposed at least at some of the cores and converting a direction of at least one of the optical paths formed by the cores to a direction different from the specified direction within the layer;
a second optical path converting device disposed at the first end of the cores that converts the optical path direction of the cores into the direction of the inlet-outlet optical path; and
a third optical path converting device disposed at the second end of the cores that converts the optical path direction of the cores into the direction of the inlet-outlet optical path.

15. The three-dimensional optical waveguide of claim 2, wherein at least one of the cores bends in a direction different then the rest of the cores in its layer.

16. The three-dimensional optical waveguide of claim 2, wherein at least one of the cores bends in a direction different than the rest of the cores in its row.

* * * * *